United States Patent Office 3,491,058
Patented Jan. 20, 1970

3,491,058
PROCESS FOR PREPARING POLY(ARYLENE OXIDE)
Charles W. Taylor, St. Paul Park, and Horace R. Davis, Roseville Village, Minn., assignors to Minnesota Mining and Manufacturing Company, St. Paul, Minn., a corporation of Delaware
No Drawing. Continuation-in-part of application Ser. No. 290,588, June 26, 1963. This application Aug. 17, 1966, Ser. No. 572,901
Int. Cl. C08g 23/16
U.S. Cl. 260—47                          8 Claims

ABSTRACT OF THE DISCLOSURE

High quality polyphenylene oxides are produced from inexpensive precursors in high yield by preparing the potassium salt of monochlorophenol in essentially pure form and heating the said salt in the presence of a copper cation-furnishing catalyst and pyridine or quinoline to a temperature of about 160–175° C. for about 3–24 hours and then to about 225–300° C. for 1–10 hours.

---

This is a continuation-in-part of patent application Ser. No. 290,588 filed June 26, 1963, now abandoned.

This invention relates to a process for the preparation of certain poly (arylene oxides), especially poly (phenylene oxides).

Processes for the preparation of poly (phenylene oxides) are known, e.g. see U.S. Patent 3,228,910 and Italian Patent 613,739. So far as is known, however, no process for the preparation of high quality, high molecular weight poly (phenylene oxides) capable, for example, of being fabricated into strong and flexible oriented fibers and biaxially oriented films has been shown previously. Furthermore, prior processes have generally been economically unsatisfactory, utilizing high cost intermediates, or having low yields of products, etc.

These problems have been overcome by the process of the present invention. Utilizing this process, it is possible to prepare high quality poly (phenylene oxides) from inexpensive precursors in substantially quantitative yield.

It is, therefore, an object of the present invention to provide a process for the preparation of certain useful poly (arylene oxide) polymers. It is another object of the invention to provide a process for the preparation of poly (phenylene oxides). It is another object of the invention to provide a process for the preparation of useful crystalline film-, fiber- and coating-forming poly (phenylene oxides). It is still another object of the invention to provide a process for the preparation of non-crystalline coating- and sealant-forming poly (phenylene oxides). Other objects of the invention will be apparent from the following disclosure.

In accordance with the above and other objects of the invention, it has been found that highly useful poly (phenylene oxides) can be prepared from mononuclear monomers (i.e. monomers containing a single benzene nucleus). The process of the invention involves the preparation of a potassium salt of a monochlorophenol and its subsequent polymerization. These reactions can be represented generally as follows:

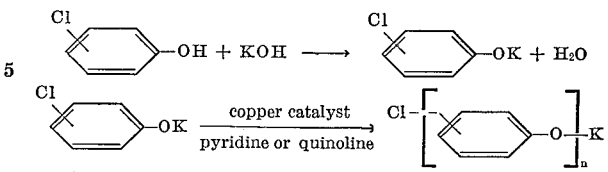

More specifically, the process comprises the following steps which are carried out with continuous exclusion of oxygen and air:

Monomer preparation (1) Reacting a monochlorophenol with aqueous carbonate-free potassium hydroxide in the presence of an inert nonaqueous solvent to form the corresponding potassium salt of a monochlorophenol as a solute in the solvent, (2) Removing the water present in the reaction mixture, e.g. by azeotropic distillation, (3) Crystallizing the anhydrous salt from solution in the inert solvent and isolating it (the resulting salt containing less than about 0.05 weight percent of water by Karl Fischer analysis), Polymer preparation (4) Charging the anhydrous salt, 0.01 to 0.5 mole percent of a copper cation-furnishing catalyst and about 2–150 mole percent (2–100 weight percent) of pyridine or quinoline to a suitable reaction vessel and, (5) Heating the mixture to about 160–175° C. for about 3–24 hours and then to about 225–300° C. for 1–10 hours.

The amounts of the catalyst and pyridine or quinoline specified in step (4) are based on the monomer salt present.

A mixture of two or more monochlorophenols is sometimes used in the reaction of step (1), e.g. when it is desired to prepare a polymer containing a combination of phenylene oxide groups, such as of o- and p-phenylene oxide groups, of o-, m- and p-phenylene oxide groups, etc. Alternatively, when a polymer containing a combination of phenylene oxide groups is to be prepared, steps (1), (2) and (3) can be carried out with individual monochlorophenols to prepare individual potassium salts thereof and these salts blended in step (4).

A small amount of free monochlorophenol (but not more than about 2 percent of the amount of monomer present, on a molar basis) is preferably present in the polymerization mixture as a polymerization initiator. With the free chlorophenol present, the polymerization starts smoothly at about 160–175° C. If there is no free chlorophenol in the mixture, polymerization does not initiate until a much higher temperature is reached, e.g. 250° C., and then it reacts violently (sometimes explosively) with the result that black tar is formed. More than 2 percent of free monochlorophenol in the polymerization mixture, on the other hand, results in an excessive loss of molecular weight of the polymer. Most preferably there is from about ¼ to 1 percent of the free chlorophenol in the mixture since less than ¼ percent presents practical problems in detecting and assuring the presence of the chlorophenol while more than 1 percent is usually accompanied by a noticeable drop in the polymer molecular weight.

Normally and preferably, the presence of the free monochlorophenol in the polymerization mixture is accomplished by simply adding a slight molar excess (normally not more than about 10 percent) of the monochlorophenol over the potassium hydroxide in step (1) above. Much of this excess monochlorophenol is lost in the mother liquor when the salt is crystallized, the amount remaining normally being less than 2 percent. Alternatively, it is possible to add the monochlorophenol at a later stage, e.g. to the final polymerization mixture itself. Adding the excess monochlorophenol as above, however, obviates the difficulties in purifying and adding it separately. The requirements for purity of the excess monochlorophenol are the same as for the monomer salt (the potassium chlorophenolate) itself and these are set out elsewhere herein.

The molar percent of free monochlorophenol in a lot of monomer salt can be easily calculated from the results of potentiometric titrations of samples thereof with non-aqueous tetrabutyl ammonium hydroxide in pyridine (to determine the amount of the unneutralized phenol) and with standard dilute aqueous hydrochloric acid (to determine the amount of salt). This calculation is usually made on any lot of monomer which is to be polymerized.

The exclusion of impurities from the monomer precursor, the monomer and from the polymerization mixture (at least until the polymerization is complete) are critical to the preparation of useful polymer by the process of the invention. Thus:

If polymers of useful molecular weight are to be formed ultimately, the monochlorophenol precursor of the monomer salt must be at least 99 percent pure (exclusive of water) and must contain essentially no phenol or polychlorophenols (as determined by vapor phase chromatographic analysis). Oxygen must be carefully removed from both the monochlorophenol and the potassium hydroxide before they are mixed to form the monomer salt and oxygen and air must be continuously and rigorously excluded from contact with the monomer salt from its formation until the polymerization is completed. If oxygen and air are not continuously excluded, there is extensive formation of color bodies in the solution which deposit on the otherwise colorless monomer salt and a much smaller yield of polymer of relatively low molecular weight will result. In addition, the monomer must be dried until it contains not more than about 0.05 percent of water (by Karl Fischer analysis) if it is to be later polymerizable into a high molecular weight, useful polymer. For these reasons, then, the monomer must be continually isolated from oxygen and air from the time of its preparation until the polymerization is complete and from water from the time of its removal from the reaction mixture in which the monmer salt is prepared until the polymerization is complete. The monomer preparation, storage and polymerization vessels as well as the systems used to transfer the monomer between them are preferably filled with nitrogen or other inert gas or are maintained under high vacuum. Care must be taken that contaminants are not introduced in or with other constituents of the polymerization charge.

Impurities in excess of 1 percent (except for water) in the monochlorophenol reactant can be removed by fractional distillation or other known techniques. Air and oxygen are conveniently removed therefrom in the reaction vessel in which the monomer salt is to be prepared by dissolving the monochlorophenol in the organic solvent system to be used in the reaction, closing the vessel and purging it (for example by repeated evacuation and filling with purified nitrogen).

Carbonate-free potassium hydroxide (Kolthoff, Zeit. anal. Chem., 61, 48 (1922)) is satisfactory for use in the process, although it is desirable to also purge the vessel from which it is charged (e.g. a dropping funnel) of air and oxygen before adding it to the monochlorophenol solution. It is preferable to add the potassium hydroxide as a standardized aqueous solution in order to more easily measure the exact amount charged and to achieve good mixing of the reactants.

The reaction between the monochlorophenol and the potassium hydroxide to form the monomer salt takes place rapidly upon mixing of the reactants. The monomer salt, which has a high affinity for water, must then be recovered essentially water free. This is accomplished by removing the water while the salt is dissolved in an inert organic solvent since water remaining in solid particles of the salt is so tightly bound that it is difficult or impossible to remove it completely enough for the purposes of the present process.

The solvent system present during the removal of water from the monomer salt contains at least one (first) component in which the monomer salt is soluble but which does not react with it, which is inert with respect to strong base and which remains in the reaction vessel (serving as a solvent for the monomer salt) while the water is removed. The water is removed by azeotropic distillation, using an additional (second) solvent, which forms an azeotrope with the water. Among the compounds which can be used as azeotroping solvents are benzene, toluene, xylene and ethers which are inert with respect to strong base and the monomer salt and which form relatively low boiling azeotropes with water. Benzene is the preferred azeotroping solvent since it forms an azeotrope which boils at a low temperature and since it is water immiscible, thus making it possible to recycle the benzene in the azeotroping process. The first solvent (in which the monomer salt is dissolved) is chosen to boil sufficiently above the azeotrope to permit easy separation, and so that it does not itself enter into the azeotrope. Among the solvents which are useful as the first solvent when the water is removed in an azeotrope are pyridine, quinoline, the dimethyl ether of diethylene glycol and dioxane.

Pyridine is the most preferred first solvent since the polymerizations are customarily run in the presence of pyridine so that pyridine remaining with the anhydrous salt is not harmful. Quinoline is a second preferred solvent.

The overall temperature range of the reaction in which the monomer salt is prepared is ordinarily between room temperature (20° C.) and the boiling temperature of the first solvent (usually not greater than 150° C.). The actual reaction proceeds smoothly and relatively rapidly at room temperature and the reactants are therefore conveniently mixed at that temperature. The mixture is then ordinarily heated to reflux to remove the water. As the water is removed, the reflux temperature increases slowly. Preferably the water is removed over a temperature range of about 90°–120° C.

The reaction and water removal are usually carried out at atmospheric pressure, particularly in view of the lighter and less complex equipment requirements. Sub- or super-atmospheric pressures can be used, however, e.g. where it is desired to use an azeotrope system balance which occurs at a pressure other than atmospheric.

Refluxing is generally continued for some time after the last observed removal of any trace of water. It is in fact desirable to distill away sufficient solvent after the water has been removed to further raise the reflux temperature of the mixture by several degrees centigrade. The monomer is then recovered and the solvent is removed. This can be accomplished by cooling the reaction mixture either with or without addition of an amount of solvent (which can be the same or different from the solvent already present), whereupon the monomer salt crystallizes, then filtering, washing the crystalline product with solvent if desired and removing the residual solvent, e.g. by passing dry nitrogen through the crystalline salt, evacuating and, in some cases, heating.

If pyridine is present when the monomer is dried and if heat is not used in the drying, two of the monmer salts of the invention (potassium p-chlorophenolate and potassium m-chlorophenolate) form solvates, i.e. dry to constant weight containing pyridine of crystallization in a definite molecular ratio which depends upon the particular monomer salt used. If heat is used in removing the solvent from the monomer (e.g. 100° C.), the monomer salt dries to constant weight without retaining any solvent of crystallization. In either case (whether or not solvent of crystallization is present in the monomer salt) mechanical shaking and sieving in a closed system in an inert atmosphere breaks the solid into a fine, free-flowing powder.

A particular advantage of the solvates is that they retain the pyridine which would otherwise have to be removed to form a dry, easily handled product and then replaced in the polymerization mixture.

The polymers are prepared, as previously noted, utilizing 0.01 to 0.5 mole percent of a copper cation-furnishing catalyst (either cuprous or cupric). A lesser amount of the catalyst is insufficient to bring about the desired polymerization while higher catalyst concentrations tend to produce lower molecular weight polymers. Pure copper metal is not a catalyst for the reaction although copper powder, unless it has been specially prepared, ordinarily contains small amounts of salts which do act as catalysts.

The suitability of a copper compound as a catalyst in the process of the invention can be determined conveniently by first charging the following to a heavy-walled glass ampoule in approximately the indicated ratios:

| | Moles |
|---|---|
| Material to be tested as catalyst | 0.001 |
| Potassium phenolate (prepared using a 1 mole percent excess of phenol over potassium hydroxide) | 1.0 |
| Chlorobenzene | 1.0 |

The ampoule is then sealed, heated to 200° C. for 16 hours, opened and the contents are rinsed into a breaker with distilled water. The resulting solution is filtered, if necessary, to remove any solids, acidified with nitric acid (e.g. to a pH of 2) and titrated potentiometrically for ionic chloride. If at least 50% of the chloride has been released from the chlorobenzene, the material is a catalyst for the polymerization step of the process of the invention.

Among the copper compounds which are catalysts for the process are cuprous chloride, cuprous bromide, cuprous oxide, cuprous cyanide, cuprous iodide, cuprous sulfite, cuprous thiocyanate, the cuprous nitrate-acetonitrile complex $Cu(CH_3CN)_4NO_3$, the cuprous chloride-pyridine complex, cupric chloride, cupric oxide, basic copper carbonate, cupric ferrocyanide, copper chromite (39.5% CuO, 42.5% $Cr_2O_3$, 10.5% BaO), copper chromite (83.3% CuO, 16.3% $Cr_2O_3$), cupric phenolate and cupric acetonyl acetonate.

The polymerization mixture must also contain from about two to one hundred weight percent of pyridine or quinoline. If the pyridine or quinoline is not present in the reaction mixture, polymer of much lower molecular weight is formed. Although the function of these compounds in the polymerization is not fully known, it is believed to be associated with their ability to act as solvents for the monomer, the polymer and the catalyst, thus bringing them into and maintaining them in more intimate homogeneous contact. The scope of the invention is to be in no way restricted by this theory, however. Finally, in some cases an inert unsubstituted aromatic organic liquid (usually benzene or diphenyl ether) is added to the mixture to improve its total fluidity where stirring is difficult. This inert liquid is, however, not necessary and is not usually used in stirred reaction vessels.

The poly (phenylene oxides) produced by the process of the invention are broadly useful having generally excellent properties of resistance to hydrolytic, thermal and oxidative degradation and chemical corrosion. They are particularly useful as electrical insulating materials where severe temperature and corrosion conditions exist. These polymers do, however, vary in certain properties and consequently in the particular areas in which they are most useful. Thus, for example, many poly (phenylene oxides) produced by the process which contain a high preponderance of para linkages (e.g. 80% or more para and not more than about 15% ortho) are higher melting, high strength, crystalline, orientable, film- and fiber-formers while amorphous, non-crystalline polymers containing a lower percentage of para linkages (the remainder being ortho) are lower melting, are soluble in various solvents and are suitable for use as coatings and in sealants. The polymers generally have inherent viscosities above about 0.25 (when measured as 1 percent solutions in sulfuric acid) and preferably have inherent viscosities above 0.30. All of the polymers having inherent viscosities of 0.25 or more can be used to form valuable coatings. It is normally necessary, however, that polymers capable of forming high strength oriented films and fibers have inherent viscosities of at least 0.3. The latter are of particularly high molecular weight. They can be formed into fibers and oriented to provide flexible, high strength fibers (often having tensile strengths of 2 grams per denier or more). Also, they can be formed into films and biaxially oriented to provide flexible high strength films.

The following examples illustrate more specifically the preferred embodiments of the invention but are not to be construed as limiting thereof. Unless otherwise specifically indicated, the following apply in the examples: All parts are by weight. Where mole percentages are indicated they are based on the amount of monomer salt present. The polymer melting points are determined by DTA (differential thermal analysis). The inherent viscosities are determined at 25° C. using a 1 percent solution of the polymer in concentrated sulfuric acid (98 percent assay), said solution being prepared by heating the polymer and acid together, e.g. 30 minutes at about 150° C. is ordinarily sufficient.

EXAMPLE 1

Preparation of the monomer salt potassium-p-chlorophenolate

Colorless p-chlorophenol (600 g., 4.67 moles) is weighed into a three-liter, three-neck flask with reagent pyridine (1400 cc.) and reagent benzene (250 cc.). The flask is assembled with a nitrogen inlet and dropping funnel on one side, thermometer extending into the liquid in the center neck and a Barrett trap with reflux condenser and small column packed with ⅛" Pyrex helices between the flask and Barrett trap on the other side. Standard, 50% aqueous (550 g., 8.25 milliequivalents per g., 4.53 moles) carbonate-free potassium hydroxide (Kolthoff, Ziet, anal. Chem., 61, 48 (1922)) is weighed into the dropping funnel and the entire apparatus is purged of oxygen by repeated evacuation and filling with purified nitrogen. The solution is stirred with a magnetic bar and the potassium hydroxide solution is allowed to run into the flask. The solution is heated to reflux while a slow stream of purified nitrogen is passed through the flask. The water is removed rapidly at first with a reflux rate at the capacity of the column. After 80–90% of the theoretical water has been removed, the boil-up rate is reduced to obtain separation (which requires a number of hours). In all, refluxing is continued 96–168 hours or until no further separation of an aqueous phase is observed. During this time the temperature of the boiling liquid rises from 90–95° to 110–112° as the last portions of water are removed. Removal of a portion of the benzene through the Barrett trap until the pot temperature reaches 117–120° C. facilitates removal of the last traces of aqueous phase. An additional 550 cc. of solvent are then removed through the Barrett trap causing the pot temperature to rise to 124–126° C. and the remaining hot, clear solution is transferred through a glass delivery tube by nitrogen pressure to a filtering vessel with a sintered glass disc in its bottom and allowed to cool. White needles quickly appear, and by the time the mixture reaches room temperature a solid white matrix of salt has formed. The mother liquor is removed by nitrogen pressure and the solid is broken up and washed with a minimum of dry benzene-pyridine (3:1). The solid is dried under nitrogen pressure until no further liquid comes through the filter, and solvent is further removed by evacuation for several hours at room temperature. A constant weight is reached when the salt contains two molecules of pyridine of crystallization per three molecules of potassium p-chlorophenolate. Mechanical shaking and sieving in a closed system in an atmosphere of dry nitrogen are used to break the large lumps of solid into a fine, free-flowing powder.

Analysis for water by Karl Fischer Reagent indicates that the salt contains less than 0.03 weight percent water. The pyridine of crystallization is readily removed by heating the salt in a steam bath in vacuo. Desolvated salt has a neutral equivalent (pH 6.0) of 166.1–167.0 (theoretical, 166.6), and melts without decomposition at 211–214° C. (evacuated capillary). With or without the solvent of crystallization it is very hygroscopic and must be stored under nitrogen. The yield of 770 g. is 77%.

EXAMPLE 2

Preparation of the monomer salt potassium-o-chlorophenolate o-Chlorophenol is fractionated to remove traces of phenol, 2,4-dichlorophenol and p-chlorophenol that are present in the commercial material. Analysis of the colorless distillate by vapor phase chromatography shows the material is >99.9% pure.

A solution of 1200 g. of this material with 2400 cc. of pyridine (freshly distilled from barium oxide) and 600 cc. of reagent benzene is placed in a 5-liter three-necked flask that is equipped with a Barrett trap and reflux condenser on one side, a nitrogen inlet in the center neck and a dropping funnel with pressure equalizing tube on the other side neck. A standardized solution of 50% aqueous, carbonate-free potassium hydroxide amounting to 97% equivalent to the phenol is placed in the dropping funnel, and the entire system is flushed 10–12 times by evacuation and filling with high purity nitrogen. The aqueous potassium hydroxide is then added to the flask while the system is flushed several additional times with nitrogen. Stirring is carried out magnetically.

Once all of the potassium hydroxide is added, the dropping funnel is replaced by a thermometer extending into the liquid and the solution is heated to reflux. Water is collected in the Barrett trap for about two days. Refluxing is continued for another 24 hours, and then benzene and pyridine are removed through the Barrett trap until the liquid temperature reaches 126–128° C. A column packed with either glass helices or with metal Podbielniak "Heligrid," may be used between the flask and the Barrett trap to facilitate the fractionation of the water-benzene azeotrope from the reaction mixture.

The resulting solution is then transferred with nitrogen pressure and while still hot to a closed filtering vessel containing 2500 cc. of dry reagent benzene. The product crystallizes quickly as white granules that settle to the bottom of the funnel. After the mixture has cooled to room temperature, the mother liquor is removed with nitrogen pressure, and the remaining solid is washed once with dry benzene and dried by evacuation at 100° C. The resulting solid potassium-o-chlorophenolate weighs 694 g. (46%) and contains .01–.02% water by analysis with Karl Fischer reagent. Titration with standard hydrochloric acid to pH 6.0 gives a neutral equivalent of 167.1; theoretical value is 166.6.

EXAMPLE 3

Preparation of the monomer salt potassium-m-chlorophenolate

A one-liter three-necked flask is equipped with a 12 inch fractionating column, Barrett trap and reflux condenser on one side, a nitrogen inlet at the center neck and a dropping funnel with pressure equalizing tube on the other side neck. A solution of 191.4 g. of m-chlorophenol, 400 cc. of pyridine (freshly redistilled from barium oxide) and 175 cc. of reagent benzene is added to the flask, and standardized, 50% aqueous, carbonate-free potassium hydroxide equivalent to 99% of the m-chlorophenol is placed in the dropping funnel.

The system is flushed several times prior to and during the addition of the base by evacuation and repressuring with purified nitrogen. Once the base has been added the dropping funnel is replaced with a thermometer and the solution is heated to reflux. Water is collected and removed through the Barrett trap for about two days. Refluxing is continued for another day to be sure all of the water is out of the system.

Solvent is removed through the Barrett trap until the liquid temperature reaches 135° C. The hot solution is then transferred by means of nitrogen pressure to a closed filtering vessel containing 500 cc. of dry reagent benzene. Bulky mats of white needles form at once, and after the mixture has cooled the mother liquor is removed with nitrogen pressure and the solid is washed twice with 500 cc. of dry benzene and dried by evacuation for 24 hours at room temperature. The yield of white solid potassium-m-chlorophenolate-pyridine complex is 249.7 g. or 85%.

The pyridine of crystallization is removed by heating a portion of the salt in vacuo at 100° for 4 hours. The weight loss from 80.0 g. of salt is 13.0 g. or 16.3%. This corresponds approximately to two molecules of pyridine to five molecules of potassium m-chlorophenolate. Substantially all of the liquid removed in this step is pyridine. The moisture content of the solvated salt determined by Karl Fischer reagent is 0.02 weight per cent.

The monomer salts of Examples 1, 2 and 3 each contain between ¼ and 1 percent free monochlorophenol (when determined by the potentiometric titrations with tetrabutyl ammonium hydroxide and dilute hydrochloric acid explained above).

EXAMPLE 4

Preparation of poly (-p-phenylene oxide) from potassium-p-chlorophenolate in the presence of pyridine.

The polymerizations are run in 30 to 60 cc. sealed glass ampoules made of heavy walled high temperature glass tubing. The ampoules as received are substantially free of grease and lint and are prepared for use by merely heating with the soft blue flame of a hand torch while under vacuum (to remove moisture) and then filling with purified nitrogen.

The catalyst (cuprous chloride) is first placed in the dried, nitrogen-purged ampoule, and the ampoule is evacuated and filled with nitrogen a second time. The monomer (containing two molecules of pyridine of crystallization per three moles of potassium-p-chlorophenolate) is then weighed into the ampoule as follows: The ampoule is connected to the storage flask containing the monomer by means of a rubber sleeve. If the monomer has been sufficiently shaken, sieved and pumped (either with or without the pyridine of crystallization) it is dry enough to pour easily through the neck of the ampoule. A rubber cap is used on the ampoule when it is being weighed both before and after the addition of the monomer. The ampoule is re-evacuated for a period varying from 2 to 66 hours, and when a liquid (a solvent, i.e. pyridine or quinoline and/or an inert, unsubstituted, aromatic organic liquid) is added, it is added while the ampoule is still under vacuum by puncturing the rubber tubing that connects the ampoule to the vacuum manifold with the hypodermic syringe.

Once the liquid has been admitted, the ampoule is chilled in liquid air and the neck flamed out under vacuum to give a clean surface for sealing. Purified nitrogen is then admitted while the neck is drawn down before being sealed under vacuum. When a liquid is not added per se (i.e. when the necessary pyridine or quinoline is present in the monomer solvate) the ampoule is merely sealed after the re-evacuation for 2–66 hours without any chilling in liquid air. The ampoule is sealed and then allowed to warm to room temperature before being placed in a steel jacket to be heated in a rocking furnace. At the end of the reaction period the ampoule is removed from its jacket and allowed to cool to room temperature.

The hot reaction mixture is a viscous mass which crystallizes on cooling to a tan solid. The cooled ampoule is opened and the contents removed and ground and extracted with dilute hydrochloric acid, water and acetone. The resulting polymer is a finely divided, cream-colored powder.

Several of these runs are summarized in Table I.

original area (3 x 3) has a tensile strength over 10,000 p.s.i. Table II shows that the electrical properties of a sample of this stretched film are valuable over a remarkably wide temperature range.

TABLE II
Electrical Properties of Biaxially Oriented Poly (p-Phenylene Oxide) Film Prepared from Lot 4B Polymer

| | 100 c./sec. | 1 kc./sec. | 100 kc./sec. |
|---|---|---|---|
| Dielectric constant at— | | | |
| 23° C | 4.76 | 4.76 | 4.76 |
| 75° C | 4.72 | 4.71 | 4.71 |
| 125° C | 4.73 | 4.71 | 4.68 |
| 175° C | 4.76 | 4.75 | 4.71 |
| 225° C | 4.60 | 4.58 | 4.54 |
| 250° C | 4.59 | 4.53 | 4.50 |
| 275° C | 4.78 | 4.50 | 4.47 |
| 300° C | 7.01 | 4.51 | 4.42 |
| Dissipation factor in percent at— | | | |
| 23° C | .05 | .05 | .13 |
| 75° C | .05 | .07 | .06 |
| 125° C | .47 | .24 | .16 |
| 175° C | .79 | .27 | .27 |
| 225° C | 3.11 | .51 | .92 |
| 250° C | 17.45 | 1.80 | .23 |
| 275° C | 44.17 | 4.62 | .23 |
| 300° C | 120.85 | 18.76 | .26 |
| Volume resistivity at— | | | |
| 23° C | | $1.0\times10^{17}$ | |
| 75° C | | $1.4\times10^{16}$ | |
| 125° C | | $6.6\times10^{13}$ | |
| 175° C | | $8.3\times10^{11}$ | |
| 225° C | | $5.4\times10^{11}$ | |
| 250° C | | $7.3\times10^{11}$ | |
| 275° C | | $3.0\times10^{11}$ | |
| 300° C | | $1.7\times10^{11}$ | |

TABLE I

| Polymer Designation | Wt. of Monomer (g.) | Conc. CuCl, mole percent | Inert Liquid | Vol. in ml. of Solvent | Reaction time (hrs.) | Conditions Temp. (° C.) | Percent Yield | $(\eta)$ in 1% $H_2SO$ |
|---|---|---|---|---|---|---|---|---|
| 4A | 20.1 | .10 | Benzene | 5.0 | 16 / 2 | 175 / 275 | 97.6 | .470 |
| 4B | 49.4 | .08 | do | 12.5 | 16 / 2 | 175 / 250 | 96.4 | .396 |
| 4C | 376.8 | .10 | do | 90 | 16 / 2 | 175 / 275 | 95.6 | .506 |
| 4D | 19.9 | .10 | None | | 16 / 6 | 175 / 250 | 96.3 | .491 |
| 4E | 402.8 | .05 | do | | 16 / 2 | 175 / 275 | 96.5 | .461 |
| 4F | 22.1 | .05 | Diphenyl ether | 1.9 | 16 / 6 | 175 / 250 | 90.6 | .455 |
| 4G | 408.2 | .10 | None | | 16 / 10 | 160 / 240 | 98.0 | .481 |

The polymers of Table I have the following physical properties in common: (1) a melting point as determined by DTA of 285–295° C. (2) a substantially complete solubility in diphenyl ether at 225° C. in the ratio of 5 g./95 g. diphenyl ether, (3) can be pressed into films which have tensile strengths of at least 5000 p.s.i. and can be given a 2 x 2 stretch to flexible films of increased tensile strength and modulus of elasticity.

Polymer 4B illustrates specifically the properties of material made by this general method: It has an M.P. of 295° C., a heat penetration temperature of >360° F., a glass transition temperature of about 194° F., a volatilization temperature (temperature where 10% weight loss occurs when heated at a rate of 12° F. rise per minute in air) of 914° F. The material is unaffected by 4 N hydrochloric acid after 16 hours at 210° C. or by 1 N sodium hydroxide after 16 hours at 150° C. It has excellent resistance to organic solvents such as acetone or ethyl acetate at room temperature and its moisture absorption is <.5%. The density is 1.26 and the refractive index is >1.65. The material can be pressed into flexible film by heating at 575° F. in a press at 2500 p.s.i. and then quenching the material instantly in cold water. Film prepared in this way is clear and transparent, can be flexed and folded repeatedly without breaking or cracking. It has a tensile strenth of 6500 p.s.i. and a modulus of elasticity of 147,000 p.s.i. with 6% elongation at the break.

A sample of this material can be stretched to over four times its original area in a Long Orienting Machine at 215° F. using either the simultaneous or the step stretching technique. A sample stretched to nine times its A quantity of poly (p-phenylene oxide) according to the invention is extruded, quenched and drawn (4 to 12) to form fiber of 18 denier diameter which has a tenacity of 2.3 grams per denier, a 14 percent elongation at break and a modulus at 1 percent elongation of 41 grams per denier. The tenacity of this fiber is not reduced by aging it for two hours at 500° C.

EXAMPLE 5

Preparation of a number of copolymers and terpolymers of ortho, meta and para phenylene oxides from potassium p-, m- and o-chlorophenolates The monomer salts are mixed in a suitable vessel in the desired proportions together with the catalyst, cuprous chloride, and the resulting solid mixture is fused and agitated either by rocking or stirring. The para monomer contains two moles of pyridine of crystallization per three moles of potassium-p-chlorophenolate and the ortho monomer contains no solvent of crystallization. The meta monomer contains two moles of pyridine to five moles of salt. The precautions to keep the monomers and the reaction mixture free of air and water vapor which are detailed in Example 4 are also utilized here. Heat is applied for a period of time first at 175° and then at 250–275° as shown in Table III. The vessel is then cooled and the contents are ground to a fine powder and washed with dilute hydrochloric acid, distilled water and acetone several times. The powder is dried for 2–16 hours in vacuo at 130° C.

TABLE III

| Polymer Designation | Charge Composition, percent [1] | | | CuCl conc. in mole percent [2] | Reaction Conditions | | Product | | | Unoriented Film |
| --- | --- | --- | --- | --- | --- | --- | --- | --- | --- | --- |
| | P | O | M | | Time (hrs.) | Temp. (°C.) | Percent Yield | M.P. by DTA | ($\eta$) in 1% $H_2SO_4$ | Tensile Strength, p.s.i. |
| 5A | 89.5 | 10.5 | 0 | .10 | 16, 2 | 175, 275 | 95.7 | 250 | .515 | 7,400 |
| 5B | 95.0 | 5.0 | 0 | .10 | 16, 2 | 175, 275 | 97.3 | 270 | .553 | 6,900 |
| 5C | 90.1 | 9.9 | 0 | .10 | 16, 4 | 175, 250 | 96.2 | 250 | .813 | 7,200 |
| 5D | 94.6 | 5.4 | 0 | .10 | 16, 6 | 175, 250 | 99.3 | 275 | .754 | 6,800 |
| 5E | 94.9 | 0 | 5.1 | .10 | 16, 6 | 175, 250 | 96.3 | 275 | .501 | 6,850 |
| 5F | 90.2 | 0 | 9.8 | .10 | 16, 6 | 175, 250 | 97.1 | 262 | .713 | 7,300 |
| 5G | 89.8 | 5.1 | 5.1 | .10 | 16, 6 | 175, 250 | 97.3 | 251 | .684 | 7,100 |
| 5H | 79.9 | 0 | 20.1 | .10 | 16, 6 | 175, 250 | 95.5 | 223 | .611 | 7,200 |
| 5I | 97.3 | 0 | 2.6 | .10 | 16, 6 | 175, 250 | 97.2 | 290 | .582 | 6,700 |
| 5J | 87.4 | 12.6 | 0 | .10 | 16, 6 | 175, 250 | 95.5 | 235 | .863 | 7,800 |
| 5K | 97.6 | 2.4 | 0 | .10 | 16, 6 | 175, 250 | 97.2 | 285 | .782 | 6,700 |
| 5L | 84.4 | 5.4 | 10.2 | .10 | 16, 6 | 175, 250 | 97.5 | (3) | .777 | 6,300 |
| 5M | 84.9 | 9.8 | 5.3 | .10 | 16, 6 | 175, 250 | 93.4 | (3) | .679 | |
| 5N | 86.1 | 13.9 | 0 | .07 | 16, 6 | 175, 250 | 90.1 | (3) | 1.13 | 6,900 |

[1] Indicating percent of the para, ortho and meta monomer salts utilized.
[2] Based on the total monomer present.
[3] In the range of 220–295° C.

The copolymers and terpolymers of Table III are substantially completely soluble in diphenyl ether in the ratio of 5 g. of polymer in 95 g. of diphenyl ether at 225° C. The unoriented films of these polymers can be biaxially stretched to at least four times their original areas.

To elucidate further the data set forth in Table III, the preparation and evaluation of polymer 5D is given in detail as follows: A heavy wall glass ampoule of 600 cc. capacity is charged with 379 g. of potassium p-chlorophenolate (1.73 moles), 16.5 g. of potassium o-chlorophenolate (.10 mole) and 183 mg. of cuprous chloride (1.85 milliequivalents or .10 mole percent of the total potassium chlorophenolate). The molar proportion of potassium o-chlorophenolate in the total potassium chlorophenolate is 5.4%. Care is taken to exclude moisture and air from the ampoule prior to and during the filling with potassium chlorophenolate and catalyst as previously disclosed. The ampoule containing the mixture is evacuated for 16 hours, sealed and heated in a rocking furnace for 16 hours at 175° C. and 6 hours at 250° C.

The ampoule is then cooled, opened and the contents (a solid mass) are ground and extracted successively with 2 N hydrochloric acid, water and acetone. After three such washing cycles the polymer is dried in vacuo at 130° C. for 16 hours giving 167.3 g. (99%) of a finely divided, free-flowing powder essentially free of pyridine, potassium chloride and low molecular weight material. The melting point of this material by differential thermal analysis is 275° C. It is pressed at 580° F. under 2500 p.s.i. and quenched immediately in cold water to give a clear flexible film with a tensile strength of 6800 p.s.i. and a modulus of elasticity of 66,000 p.s.i. Stretching to 6.25 times its original area (2.5 x 2.5) in the Long Orienting Machine at 215° F. gives a film with a greatly improved modulus, 134,000 p.s.i.

EXAMPLE 6

Preparation of poly (p-phenylene oxide) from potassium-p-chlorophenolate in the presence of quinoline Potassium p-chlorophenolate which contains no solvent of crystallization (14.87 g., 0.0892 mole) is charged from a storage vessel into a 60 ml. heavy walled glass ampoule through a short length of surgical tubing. Purified cuprous chloride (12 mg., 0.135 mole percent) is then introduced followed by 2 cc. quinoline that has been freshly distilled from zinc dust. The ampoule is flushed with nitrogen, evacuated and sealed and then heated 16 hrs. at 160° C. followed by 6 hrs. at 250° C. in a rocking furnace. The ampoule is cooled, opened, and the contents washed with 6 N HCl, water, and acetone using a blendor for the water and acetone washes. This operation is repeated three times followed by vacuum drying of the washed polymer. The tan colored polymer weighs 7.90 g. (95% yield) and has an inherent viscosity of 0.412 in conc. $H_2SO_4$. It can be pressed into a flexible tough film by the usual technique.

EXAMPLE 7

Preparation of a mixed monomer salt of potassium-p-chlorophenolate and potassium-o-chlorophenolate and its polymerization to form poly (phenylene oxide) containing both para- and ortho-phenylene oxide linkages About 763 grams of p-chlorophenol and 40 grams of o-chlorophenol are weighed into a five-liter, three-neck flask and 2400 ml. of reagent pyridine and 500 ml. of reagent benzene are added. The flask is equipped as in the previous examples of monomer preparation and is then evacuated and filled several times with purified nitrogen. Standard aqueous (725 g., 8.31 milliequivalents per g.) carbonate-free potassium hydroxide is then allowed to drop slowly into the flask from a dropping funnel which has a pressure equalizing arm while the funnel is under vacuum. When the addition is complete, nitrogen is again admitted and water is removed by azeotropic distillation through a Barrett trap over a period of several days. After the water has been removed, benzene and pyridine are distilled out until the pot temperature reaches 125° C. The solution is then transferred under nitrogen pressure to a filtration vessel where the white, crystalline salt mixture is recovered, washed and dried at room temperature as in the previous examples. The product weighs 936 g. (71.2% of the theoretical yield) and contains 23.8% of pyridine of crystallization. It contains 0.016% by weight of water by analysis with Karl Fischer reagent.

A portion of this mixed monomer (22.0 g.) is charged with 10 milligrams of cuprous chloride to a heavy walled glass ampoule as in the previous examples, the ampoule is sealed and heated for 16 hours at 160° C. and 6 hours at 250° C. A 95% yield of copolymer which melts at about 270° C. is recovered.

EXAMPLE 8

Preparation of a low melting, amorphous copolymer of ortho- and para-phenylene oxides Potassium o-chlorophenolate containing no solvent of crystallization (610.2 g., 3.665 mole) is charged from a storage vessel through thin walled rubber tubing into a 3 l. stainless steel autoclave that has been previously dried and purged with nitrogen at 200° C. Potassium p-chlorophenolate containing two moles of pyridine of crystallization per three moles of salt (1416 g., 6.450 moles) is then added in the same manner. The mole ratio of mixed monomer salts to pyridine is thus 5:2. Finally, 0.950 g. (0.095 mole percent) of purified cuprous chloride is added and the addition assembly is replaced by the head of the autoclave. After the head is carefully secured, the autoclave is evacuated for several hours, filled with nitrogen and closed. The autoclave is placed in a rocking heater and heated 14 hours at 180° C. and then 5½ hours at 250° C. (3 hours being required to attain each temperature level). The autoclave is then cooled to 100° C. and 1 l. methylene chloride is introduced. The autoclave is emptied and rinsed out with an additional liter of methylene chloride.

The polymer solution is added slowly to 5 gallons methanol which is stirred with a Cowles Dissolver. The solid thus obtained is filtered and washed alternately with water and methanol (two times) and dried under high vacuum. The yield of tan polymer is 896 g. (96.4%). This polymer has an inherent viscosity (as a 1% solution in $CHCl_3$) of 0.268, has a melting point below 135° C., is amorphous and is soluble in benzene, chloroform, toluene and chlorobenzene.

What is claimed is:

1. A process for the preparation of poly(phenylene oxide) from monochlorophenol with continuous exclusion of oxygen which comprises
   (1) reacting monochlorophenol which is at least 99 percent pure (exclusive of water) and which is essentially free of phenol and polyhalophenols with aqueous, carbonate-free potassium hydroxide in the presence of an inert nonaqueous solvent system, both reactants having had oxygen removed from them prior to the reaction, to form the corresponding potassium salt of monochlorophenol as a solute in the solvent system,
   (2) removing the water present in the reaction mixture,
   (3) crystallizing the anhydrous salt from solution and isolating it,
   (4) charging the anhydrous salt, 0.01 to 0.5 mole percent of a copper cation-furnishing catalyst and 2–150 mole percent of a compound selected from the class consisting of pyridine and quinoline to a suitable reaction vessel, this charge also containing a small amount but not more than about 2 mole percent of free monochlorophenol, and
   (5) heating the mixture to about 160–175° C. for about 3–24 hours and then to about 225–300° C. for 1–10 hours.

2. A process according to claim 1 wherein the monochlorophenol in the charge of step (4) is added separately to the charge.

3. A process according to claim 1 wherein the poly (phenylene oxide) is prepared from a plurality of monochlorophenols selected from the class consisting of o-chlorophenol, m-chlorophenol and p-chlorophenol.

4. The process of preparing poly (phenylene oxide) which comprises
   (1) charging a monomer consisting of pure, anhydrous, oxygen-free, air-free potassium monochlorophenolate, a small amount but not more than about 2 mole percent of pure, anhydrous, oxygen-free, air-free, monochlorophenol, 0.01 to 0.5 mole percent of a copper cation-furnishing catalyst and 2–150 mole percent of a compound selected from the class consisting of pyridine and quinoline to a suitable reaction vessel and
   (2) heating the mixture to about 160–175° C. for about 3–24 hours and then to about 225–300° C. for 1–10 hours,
said process being carried out with continuous exclusion of oxygen and water.

5. A process according to claim 4 wherein the poly (phenylene oxide) is prepared from a mixture of potassium salts of monochlorophenols.

6. A process according to claim 4 wherein the catalyst is cuprous chloride.

7. The process of preparing poly (p-pheylene oxide) which comprises
   (1) charging a monomer consisting of pure anhydrous, oxygen-free, air-free potassium-p-chlorophenolate, a small amount but not more than about 2 mole percent of pure, anhydrous, oxygen-free, air-free, monochlorophenol, 0.01 to 0.5 mole percent of a copper cation-furnishing catalyst and 2–150 mole percent of a compound selected from the class consisting of pyridine and quinoline to a suitable reaction vessel and
   (2) heating the mixture to about 160–175° C. for about 3–24 hours and then to about 225–300° C. for 1–10 hours,
said process being carried out with continuous exclusion of oxygen and water.

8. A process for the preparation of poly (phenylene oxide) from monochlorophenol with continuous exclusion of oxygen which comprises
   (1) reacting a slight excess of monochlorophenol which is at least 99 percent pure (exclusive of water) and which is essentially free of phenol and polyhalophenols with aqueous, carbonate-free potassium hydroxide in the presence of an inert nonaqueous solvent system, both reactants having had oxygen removed from them prior to the reaction, to form the corresponding potassium salt of the monochlorophenol as a solute in the solvent system,
   (2) removing the water present in the reaction mixture,
   (3) crystallizing the anhydrous salt containing a small amount but not more than about 2 mole percent of free monochlorophenol from solution and isolating it,
   (4) charging the anhydrous salt, 0.01 to 0.5 mole percent of a copper cation-furnishing catalyst and 2–150 mole percent of a compound selected from the class consisting of pyridine and quinoline to a suitable reaction vessel and
   (5) heating the mixture to about 160–175° C. for about 3–24 hours and then to about 225–300° C. for 1–10 hours.

References Cited

UNITED STATES PATENTS

| | | | |
|---|---|---|---|
| 1,955,080 | 4/1934 | Mills | 260—154 |
| 2,769,833 | 11/1956 | Weil | 260—473 |
| 3,083,234 | 3/1963 | Sax | 260—613 |
| 3,159,684 | 12/1964 | Merica | 260—613 |
| 3,228,910 | 1/1966 | Stamatoff | 260—47 |
| 3,268,478 | 8/1966 | Brown | 260—47 |

WILLIAM H. SHORT, Primary Examiner

MELVIN GOLDSTEIN, Assistant Examiner

U.S. Cl. X.R.

260—623; 264—289, 291